Figure 1:
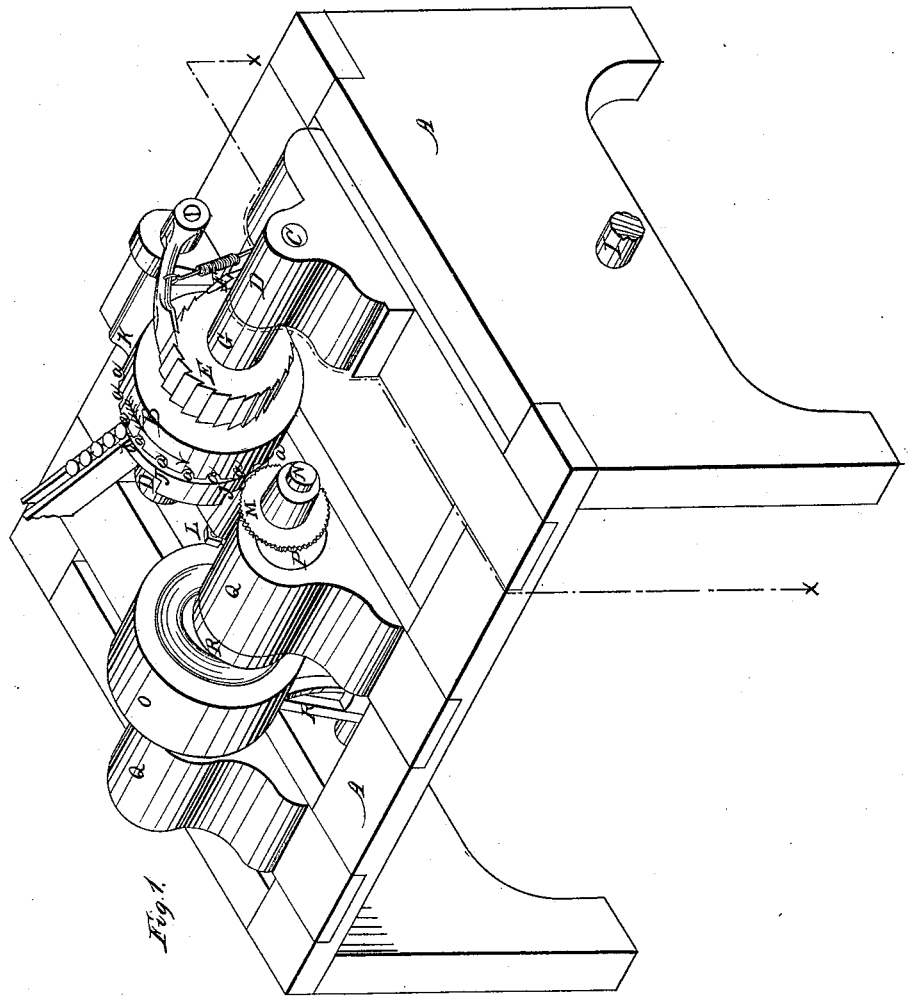

Sheet 1, 2 Sheets.

C. Whipple.
Making Wood Screws.

Nº 14,041.   Patented Jan. 1, 1856.

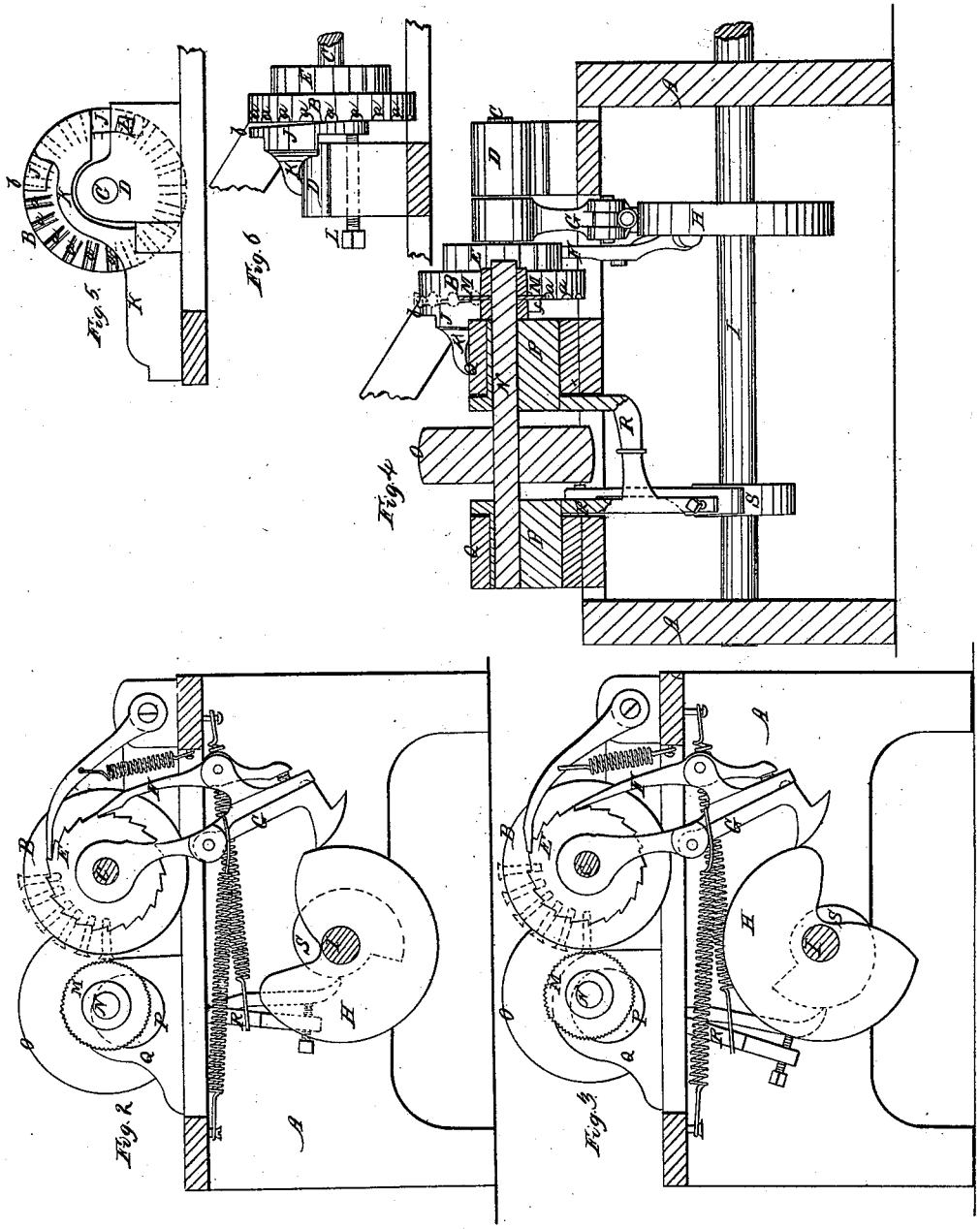

UNITED STATES PATENT OFFICE.

CULLEN WHIPPLE, OF PROVIDENCE, RHODE ISLAND, ASSIGNOR TO THE NEW ENGLAND SCREW COMPANY.

IMPROVEMENT IN SCREW MACHINERY.

Specification forming part of Letters Patent No. 14,041, dated January 1, 1856.

*To all whom it may concern:*

Be it known that I, CULLEN WHIPPLE, of the city and county of Providence, in the State of Rhode Island, have invented a new and useful Improvement in Screw Machinery, of which the following is a full, clear, and exact description, reference being had to the annexed drawings, which make part of this specification, and in which—

Figure 1 represents a view in perspective of a machine for nicking the heads of screws to which my improvements are applied. Fig. 2 represents a transverse section of the machine at the line X X of Fig. 1, showing the nicking-tool thrown back to allow a nicked blank to be discharged and an unnicked one to be presented for nicking. Fig. 3 represents a similar section of the machine, the nicking-tool being in its forward position and cutting a nick in the head of a blank. Fig. 4 represents a longitudinal section taken through the axis of the nicking-tool. Fig. 5 represents a side elevation of the blank-holder and gripping-plate with a portion of the frame detached, and Fig. 6 represents a front view of the same parts.

My invention and improvement consist of a device for taking screw-blanks at short intervals and one at a time from a row or series in a feeding slot or groove and carrying them forward by an intermittent motion in a row in which they are placed at equal distances apart, and when the foremost blank arives at the proper position for a cutter suitably arranged to make a nick in its head there stopping and gripping and holding it firmly until the nick is made in its head, then again advancing the row to discharge the nicked blank, and bringing forward the next to have its nick cut.

My invention consists, further, in a peculiar method of arranging and feeding the nicking-saw so as to diminish the jar and thereby cause it to preserve its sharpness longer and to cut smoother and more uniform nicks; also, to facilitate the removal and replacement of saws, thereby economizing time; to render the machine more compact, simple, and less liable to get out of order, and therefore requiring less skill and expense and cheaper labor to work it, and to enable it to nick screws more rapidly and therefore at diminished cost, while the average quality of its work is improved.

The device for removing the screw-blanks one at a time from the feeding-trough, arranging them in a row at equal distances apart, carrying them forward by an intermittent motion, and gripping the foremost of them consists of a moving surface having a series of grooves therein, each to receive a screw-blank from a suitable feeder, and of a fixed smooth surface alongside of the grooved surface at a slight inclination thereto, one of the extremities of the smooth surface being far enough from the grooved surface to admit the screw-blanks freely into the wide end of the wedge-shaped space between them, while the opposite end of the smooth surface is near enough to the grooved surface to compress each blank as it passes into the groove which carries it with force sufficient to grip and hold it firmly, as if between the jaws of a vise, while the nick is being cut in its head.

In the accompanying drawings there is a strong frame A represented, suitable to support the several operating parts of a machine for nicking the heads of screw-blanks. On this frame a disk B is supported on a shaft C, mounted in suitable bearings D. On one side of this disk a series of equidistant radial grooves $a$ are formed, each being of the proper size to receive a screw-blank and embed it to at least half its diameter. On the same shaft which carries the disk a ratchet-wheel E is fixed, whose teeth are equidistant and correspond in number with the grooves $a$ on the face of the disk. This ratchet-wheel is actuated at intervals by means of a ratchet-hand F, which derives its motion from a treadle G, operated by a cam H on the shaft I, extending across the lower part of the frame.

Adjacent to that side of the disk in which the series of grooves $a$ are made a strong plate is placed, curved to correspond with the periphery of the disk. This plate J is supported by a bracket K, bolted to the frame. The side of this plate J next to the disk B is smooth and at unequal distances from the face of the disk, being at a distance therefrom equal to about half the diameter of a screw-blank at the end $b$ of the space between the plate and the disk at which the blank enters. The plate inclines from this end toward the disk, so that at and for some distance near the opposite end of the space its face and that of the disk are nearly in contact. The last-mentioned end of the plate is held at the proper distance from the disk by means of an adjusting-screw L. The approximation of the gripping-plate toward the disk gradually forces the screw-blanks into their respective grooves until the pressure is sufficient to hold them firmly during the operation of nicking. The blanks are carried forward and thus held in succession until a nick is sawed into the head of each, when the further motion of the disk discharges the nicked blank and brings another of the series into the proper position to be nicked.

The screw-blanks are fed into the grooves of the disk by means of an inclined groove or slot in which they hang by their heads with their shanks downward. The blanks may be supplied to this feed-slot by means of Merrick's or any other machine capable of arranging and supplying them properly, and I use Merrick's, as I deem it the best.

During the interval while the disk B is at rest and the blanks held still, a saw or burr-cutter M is caused to approach toward the head of the foremost blank of the series between the smooth gripping-plate and grooved disk, each blank being held when it arrives at this point with its head projecting radially toward the axis of the saw. The saw is mounted upon a shaft N, which receives a rotary motion from a pulley O on its middle. This shaft rests at each end in a cylindrical box or bearing formed in a cylindrical block P and parallel to but eccentric to the axis thereof. Each of these cylindrical bearing-blocks rests in a cylindrical cavity or hole in a bracket or standard Q, and the two blocks are united by a yoke R, so formed as not to interfere with the strap or pulley that drives the saw. The yoke has a shoe attached to it, which rests against a cam S on the main shaft I. This cam communicates to the yoke an oscillating motion, which oscillates the bearing-blocks P on their own axis, and this vibrates the axle N, resting in the blocks, giving to the saw upon the axle a like motion, which causes it to approach toward and enter the head of the blank, to cut the nick, and then to recede therefrom to permit the nicked blank to be carried off and an unnicked one to be brought into its place to be in turn nicked. This motion of the saw takes place while the grooved disk B is standing still, and the saw in its turn stands back out of reach of the blanks while the disk is moving to discharge one blank and bring up another.

What I claim as my invention, and desire to secure by Letters Patent, is—

1. The combination of a series of grooves in a moving surface with a smooth guard and gripping-plate, operating substantially as described.

2. The nicking-saw mounted in the oscillating eccentric bearings resting in cylindrical boxes, in combination with mechanism for presenting and holding the blank, as herein described.

In testimony whereof I have hereunto subscribed my name.

CULLEN WHIPPLE.

Witnesses:
  F. G. FONTAINE,
  P. H. WATSON.